(12) United States Patent
Uhl et al.

(10) Patent No.: US 8,103,153 B2
(45) Date of Patent: Jan. 24, 2012

(54) RELIABLE MONITORING OF THE SPEED IN COORDINATE MEASURING APPLIANCES

(75) Inventors: Peter Uhl, Unterschneidheim (DE);
Günter Grupp, Böhmenkirch (DE);
Thomas Maier, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 678 days.

(21) Appl. No.: 12/280,625

(22) PCT Filed: Feb. 16, 2007

(86) PCT No.: PCT/EP2007/001563
§ 371 (c)(1),
(2), (4) Date: Oct. 15, 2008

(87) PCT Pub. No.: WO2007/098886
PCT Pub. Date: Sep. 7, 2007

(65) Prior Publication Data
US 2009/0026995 A1    Jan. 29, 2009

(30) Foreign Application Priority Data
Feb. 24, 2006 (DE) .......................... 10 2006 009 181

(51) Int. Cl.
*H02P 7/06* (2006.01)
(52) U.S. Cl. ........ 388/804; 318/565; 318/560; 318/561; 318/568.1; 318/638; 73/1.37; 73/1.79; 33/503

(58) Field of Classification Search .................. 388/804; 318/565, 560, 561, 568.1, 638, 649; 73/1.79, 73/1.37; 33/503
See application file for complete search history.

(56) References Cited

U.S. PATENT DOCUMENTS

| | | | |
|---|---|---|---|
| 5,819,202 A | 10/1998 | Sato et al. | |
| 6,475,115 B1 * | 11/2002 | Candito et al. | 482/4 |
| 6,568,242 B2 * | 5/2003 | Nai | 73/1.79 |
| 2002/0095975 A1 | 7/2002 | Nai | |

FOREIGN PATENT DOCUMENTS

| | | |
|---|---|---|
| DE | 10050795 A1 | 7/2001 |
| DE | 102004038416 A1 | 2/2006 |

\* cited by examiner

*Primary Examiner* — Walter Benson
*Assistant Examiner* — Erick Glass
(74) *Attorney, Agent, or Firm* — Laurence A. Greenberg; Werner H. Stemer; Ralph E. Locher

(57) ABSTRACT

In a method for reliably monitoring the speed of a moveable coordinate measuring device, a first value of the speed is calculated from measured values of the coordinate measurement system. The measured values contain information on positions of the coordinate measuring device. The measured values are further used to determine the coordinates of a measurement object. A second value of the speed is ascertained from measurement signals of at least one additional movement sensor. The measurement signals can also be used for controlling a drive device of the coordinate measuring device. A fault signal can be generated if the first value and/or the second value deviate from one another, from a predetermined value and/or a limit value according to a predefined criterion.

13 Claims, 4 Drawing Sheets

RELIABLE MONITORING OF THE SPEED IN COORDINATE MEASURING APPLIANCES

BACKGROUND OF THE INVENTION

Field of the Invention

The invention relates to a method for reliably monitoring the speed of a movable coordinate measuring device, and relates to a coordinate measuring appliance with such a coordinate measuring device, in particular a probe. The coordinate measuring device can be moved linearly, for example in a plurality of directions.

Such coordinate measuring appliances are generally known, for example from US 2001/013177 A1. However, the invention is not restricted to a specific type of coordinate measuring devices (for example a scanning probe of the switching or nonswitching type).

When the coordinates of measured objects are measured with movable coordinate measuring devices, it is necessary to take specific precautionary measures. On the one hand, the measured object itself has to be protected against mechanical damage which could occur when the coordinate measuring device impacts against the measured object. On the other hand, persons and parts of the measuring arrangement themselves also have to be protected against such mechanical injury or damage. The speed of the coordinate measuring device therefore has to be reliably monitored, i.e. monitored in a way which is particularly reliable with respect to faults.

Monitoring is understood in particular to be a process which goes beyond the detection of the speed and use of this information for the normal operation of the coordinate measuring appliance. In this sense, detecting the speed (for example by evaluating the tachosignal) and using the information about the detected speed (for example by comparing it with a speed setpoint value) merely to adjust the speed or to control it therefore does not constitute monitoring. Instead, monitoring is understood to mean that the detection of the speed and/or the normal operation of the coordinate measuring appliance are/is monitored. The normal operation of the coordinate measuring appliance comprises, in particular, only that part of the operating process which is necessary to determine the coordinates but not that part of the operating process which ensures operation in the sense described in the introduction to the description. Monitoring is also understood in particular to mean that the detected speeds lead to a safety measure which goes beyond the normal operation of the coordinate measuring appliance. The safety measure is, for example, the generation of a fault signal and/or a warning signal.

DE 199 37 737 A1 describes a device and a method for reliably monitoring the rotational movement of a shaft. In the introduction to the description of the document, what is referred to as a resolver is mentioned as a rotational movement sensor. The resolver is a rotational transformer whose rotor is connected to the shaft to be monitored and whose stator has two windings which are separate from one another and which are arranged offset with respect to one another by a rotational angle of 90° on the outer circumference of the shaft. The two stator windings receive, by means of the transformatory coupling, a signal which is fed via the rotor winding. The signals at the output of the stator windings represent a first signal and a second signal, which respectively represent the time profile of the rotational angle position of a first reference point and of a second reference point of the shaft.

DE 199 37 737 A1 proposes that evaluation means contain a comparator with which instantaneous values of the first and second signals can be compared with one another on the basis of a predefined geometric relationship. Only the angular speed or the absolute speed at the circumference of the shaft is monitored directly with this comparator.

In the introduction to the description of the document, it is also mentioned that, in addition to the resolver, at least one further rotational movement sensor is arranged in the region of the shaft. However, this is necessary only because in the corresponding arrangements the evaluation circuits are not suitable for ensuring reliable monitoring of rotational movements on the basis of the resolver signals. It would even be possible to use two mutually separate rotational movement sensors, for example incremental signal transmitters, for reliable monitoring. Said signal transmitters are generally used solely for reliably monitoring the rotational movement of the shaft. In contrast, the resolver could be used to control the rotational movement of the shaft in the normal operating mode.

The costs and the technical expenditure which are incurred for additional movement sensors are high. In particular, the movement sensors and the evaluation device which is combined therewith have to function reliably and precisely in any conceivable operating situation.

BRIEF SUMMARY OF THE INVENTION

An object of the present invention is to specify a coordinate measuring appliance and a method for reliably monitoring the speed of a coordinate measuring system which make it possible to reduce the costs and the technical expenditure which are incurred in monitoring.

It is proposed to calculate and/or determine the speed of the coordinate measuring device in each case from two different signal sources which are independent of one another, with the two signal sources also being used for the operation of the coordinate measuring appliance. A first value of the speed is calculated, in particular, from measured values of the coordinate measuring system. For this purpose, the measured values have information about positions of the coordinate measuring device. This information is used to calculate the speed of the coordinate measuring device, for example by derivation of the position over time.

A second value of the speed is determined, in particular, from measurement signals of an additional movement sensor (additional to the coordinate measuring system). The measurement signals of the additional movement sensor are also used for controlling a drive device of the coordinate measuring device. For example, as described in DE 199 37 737 A1, it is possible to use a resolver or a rotational transformer with just one signal generator as an additional movement sensor.

In particular, a method for reliably monitoring the speed of a movable coordinate measuring device is proposed in which the coordinate measuring device is part of a coordinate measuring system for determining coordinates of measured objects. Furthermore, (a) a first value of the speed is calculated from measured values of the coordinate measuring system, wherein the measured values have information about positions of the coordinate measuring device and wherein the measured values are also used to determine the coordinates, (b) a second value of the speed is determined from measurement signals of at least one additional movement sensor, wherein the measurement signals are also used, or can be used, for controlling a drive device of the coordinate measuring device, and (c) a fault signal is generated if, according to a predefined criterion, the first value and/or the second value differ from one another, from a setpoint value and/or from a limiting value.

A coordinate measuring device is understood, in particular, to be all the movable parts of the coordinate measuring system which are moved for the purpose of determining the coordinates of the measured object or measured objects. In a coordinate measuring appliance of the gantry design, these include, in particular, the actual probe but also the parts which are moved along with the probe, specifically for example the bridge of the gantry, a carriage which can move in relation to the bridge and the parts which can move, together with the probe, in relation to the carriage. For this reason, the various parts of the coordinate measuring device can be at different speeds. It is therefore correspondingly possible to monitor different speeds or merely individual parts of the coordinate measuring device in terms of their speed. Alternatively or additionally it is possible, for example, to monitor different speed components of the speed of a part or of the entire device.

A fault signal is understood, in particular, to be a signal which is generated automatically when the predefined criterion is met, i.e. when the fault occurs. The meaning and/or cause of the fault may vary in nature here. For example, a fault may be present in the additional movement sensor and/or during the processing of the measurement signals supplied by the movement sensor. In particular, an integrated circuit may have failed. However, it could also be a software fault which, for example in certain operating situations, supplies incorrect results for the first or second values of the speed. The fault signal may, for example, be displayed and/or automatically trigger intervention into the operation of the coordinate measuring appliance. For example, the fault signal can therefore be a switch-off signal. In order to protect equipment and/or persons it is generally necessary to stop all the drives of the coordinate measuring device even if only one of the speed values determined in different ways indicates the presence of a fault.

In particular, the first value and the second value can each be updated repeatedly, and the predefined criterion can be repeatedly applied to the updated values in each case.

The predefined criterion can also vary in nature. If, for example, the two values differ from one another by more than a predefined limiting value at a certain point in time or over a defined time period, the fault signal can be generated. In this case it is to be assumed that one of the two partial procedures (either for determining the first value of the speed or for determining the second value of the speed) is faulty.

Alternatively or additionally it is possible to predefine a maximum value of the maximum acceptable speed. For example, the maximum value is changed in the course of time, in particular as a function of the operating state, of signals/states of protection devices such as, for example, photoelectric barriers and/or step mats, of a predefined setpoint value and/or of the local region in which the coordinate measuring device is located. In this context it may be permitted that when the maximum value is reduced, the old, relatively high maximum value still applies for a transition time, said maximum value being required for braking the coordinate measuring device owing to inertia. A fault occurs in particular even if only one of the determined speed values reaches or exceeds the maximum value.

The fault signal is preferably generated if one of the speed values continuously reaches and/or exceeds the maximum value over a time interval of predefined length. Alternatively or additionally it is possible, when determining whether the maximum value is reached and/or exceeded, to use in each case a smoothed speed value which is obtained by smoothing fluctuations over time in the initially determined or calculated value. In both cases it is possible as a result of this to ensure that a very brief upward transgression (caused in particular by a temporary measuring fault) or the very brief attainment of the maximum value still do not have any effects on the operation of the coordinate measuring appliance.

In addition, the criterion can also include a setpoint value of the speed which is predefined, for example, by a control program. If the first value of the speed or the second value of the speed are significantly above the setpoint value, the presence of a fault should also be concluded. Given fault-free operation, the additional movement sensor of the drive device serves, in particular, to adjust the actual speed to the setpoint value.

All the statements in this description relating to "the speed" and/or method features can each apply separately to individual speed components (for example in the x, y and z directions of a Cartesian coordinate system). In particular, the reliable monitoring of the speed can in each case be carried out separately and independently for the various drive devices of a coordinate measuring system or movement components (for example in the x, y and z directions of the coordinate system), with each of the drive devices controlling the movement of the coordinate measuring device along one of a plurality of independent coordinate axes.

A plurality of electric motors which together bring about the total movement of the coordinate measuring device are preferably provided. In this context, the movements of the electric motors are clearly assigned to movement components of the movement of the coordinate measuring device. For example, in each case at least one electric motor is provided for a linear movement of the coordinate measuring device, and each of the linear movements here can occur exclusively in one of three directions which are arranged perpendicular to one another in pairs. As a result, it is therefore possible to move to any desired point on a direct path within an achievable range of movement. In particular, the three speed components of the three linear movements can be monitored. This includes the case in which more than one electric motor is used to generate at least one of the movement components (for example one of the three linear movements). In this case, the speed of the electric motors can be monitored independently of one another for the same movement component or monitored jointly (for example by forming a mean value of the speeds), or just one of the electric motors is monitored.

The clear assignment of the electric motors to the movement components also includes the case in which the movements which are generated by the individual electric motors are coupled kinematically. In this case, the second value of the speed can be determined from measurement signals of a plurality of the additional movement sensors. For example, the movements of a first electric motor and of a second electric motor are coupled kinematically in such a way that the movement of the first electric motor contributes to the combined movement multiplied only by a factor of less than one, while the movement of the second electric motor contributes one-to-one (or alternatively multiplied by a different factor) to the combined movement.

The determination of coordinates in a coordinate system is not restricted to Cartesian coordinates. Instead, coordinates of any type can be determined, for example polar coordinates, cylinder coordinates etc.

A coordinate measuring appliance is understood not only to be an appliance with which coordinates can be determined in a coordinate system but also an appliance with permits a position of a measured object to be checked. For example, the coordinate measuring device can have a mechanical sensor and/or an optical sensor.

An important advantage of the invention is that signals from the normal operating mode of the coordinate measuring appliance are used for reliable monitoring of the speed, for which, at least to a certain extent, a high-precision evaluation of these signals can also be used. The determination of the coordinates of measured objects in coordinate measuring appliances is therefore generally highly precise. It is therefore also possible to determine a precise speed value. In order to increase the precision when calculating the speed, the coordinate measuring appliance can have a high-precision time signal generator which supplies the time base for the derivation over time. Also, the sampling rate which is available with modern coordinate measuring appliances when recording the measured values for the determination of the coordinates is so high that the calculation of the speed can also be configured in a very precise way.

The scope of the present invention also includes a coordinate measuring appliance which has the following:
(a) a coordinate measuring system for determining coordinates of measured objects with a coordinate measuring device, in particular with a probe, which can be moved at least in one direction, driven by at least one drive device,
(b) an evaluation device of the coordinate measuring system which is configured to determine the coordinates from measured values which have information about positions of the coordinate measuring device,
(c) a drive control device with a movement sensor which generates measurement signals of a movement of the coordinate measuring device which are used by the drive control device to control the drive device of the coordinate measuring device,
(d) a monitoring device for reliably monitoring the speed of the coordinate measuring device,
(e) a first speed determining device of the monitoring device which is connected to the coordinate measuring system and is configured to calculate a first value of the speed from measured values of the coordinate measuring system, and
(f) a second speed determining device of the monitoring device which is connected to the movement sensor and is configured to determine a second value of the speed from the measurement signals of the additional movement sensor.

The coordinate measuring appliance can also have a device for detecting an overcurrent, i.e. a current for supplying the drive device or a part of the drive device which is higher than an anticipated value or maximum value. If the detected current reaches or exceeds the anticipated value or the maximum value, suitable protective measures can also be taken (for example switching off of the drive or drives).

The monitoring device can also be an object or an arrangement which forms a unit which is separate from the coordinate measuring appliance. For example, an existing coordinate measuring appliance can be retrofitted with such a monitoring device.

In particular, the first speed determining device can have a first microcomputer, and the second speed determining device can have an additional, second microcomputer. In addition, the first speed determining device and the second speed determining device can each be connected to a switch-off device for switching off a power supply of the drive device. Using various microcomputers increases further the reliability of the monitoring. Not only are various measurement signals used for calculating the first and second values of the speed, but also the calculation of the speed values or determination of the speed values occurs in different components.

One of the two microcomputers, in particular the first microcomputer, can also serve to control the operation of the coordinate measuring appliance. In practice, this constitutes an embodiment which can be implemented at low additional cost because the control computer which is present in any case merely has to be programmed or configured in such a way that it also calculates the speed from the coordinates. In addition, all that is necessary is to provide an additional, second microcomputer or to configure correspondingly such a microcomputer which is already present, in order to calculate the second value of the speed from the signals generated by the movement sensor.

For further advantages and further possible refinements of the coordinate measuring appliance, reference is made to the description of the method according to the invention.

Exemplary embodiments of the invention will now be described with reference to the appended drawing. In the drawing:

BRIEF DESCRIPTION OF THE SEVERAL
VIEWS OF THE DRAWING

DESCRIPTION OF THE INVENTION

Figure 1:
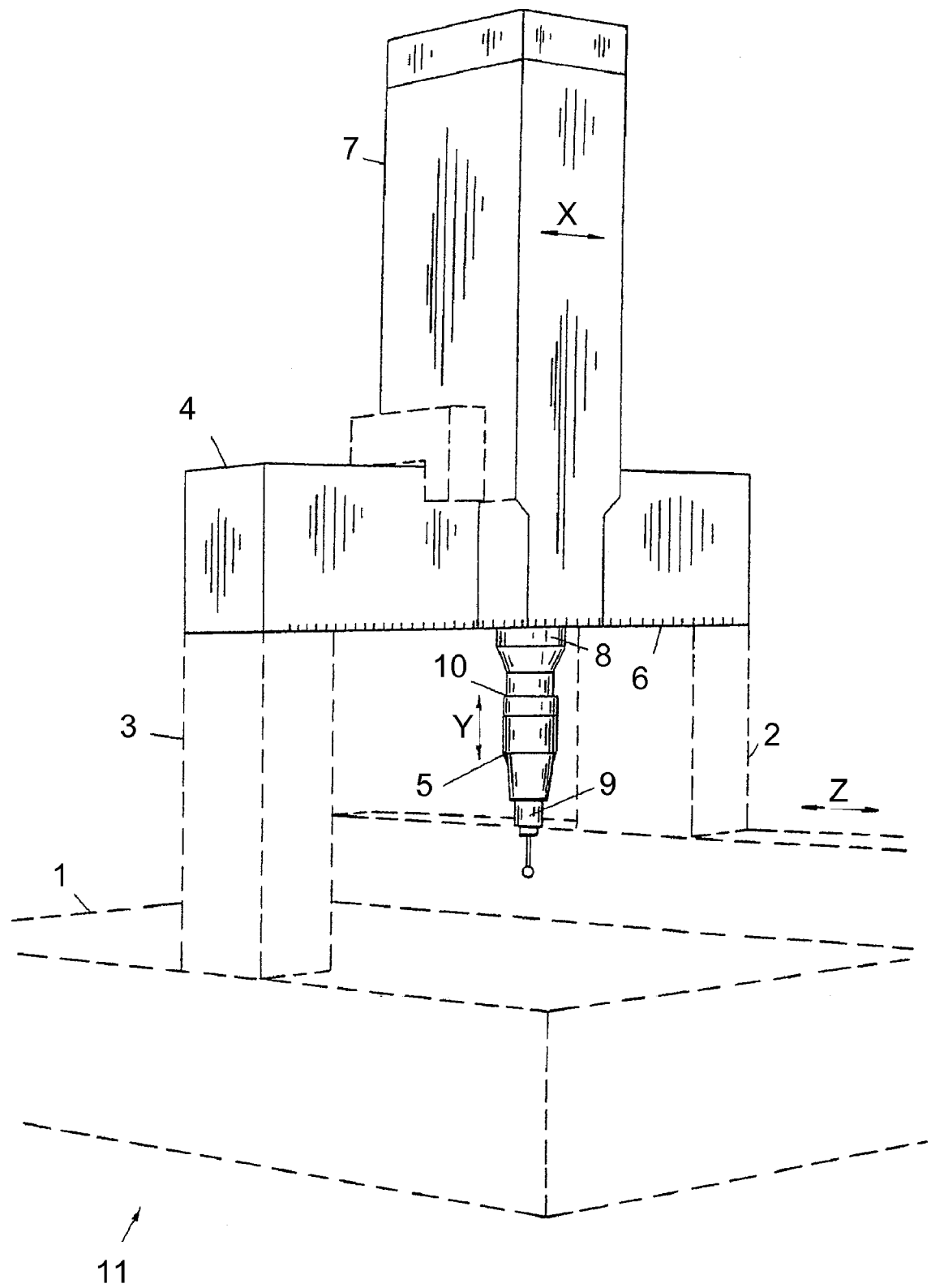
FIG. 1 shows a coordinate measuring appliance of a gantry design.

The coordinate measuring appliance (CMA) 11 of a gantry design which is illustrated in FIG. 1 has a measuring table 1, and columns 2, 3 are arranged in such a way that they can move over said measuring table 1 in the Z direction of a Cartesian coordinate system. The columns 2, 3 form, together with a crossmember 4, a gantry of the CMA 11. The crossmember 4 is connected at its opposite ends to the columns 2 and 3. Electric motors (not illustrated in more detail) cause the columns 2,3 to move linearly in the Z direction. In this case, each of the two columns 2,3 is assigned an electric motor.

The crossmember 4 is combined with a transverse carriage 7 which is movable with air bearing along the crossmember 4 in the X direction of the Cartesian coordinate system. The instantaneous position of the transverse carriage 7 relative to the crossmember 4 can be detected on the basis of a scale division 6. The movement of the crossmember 4 in the X direction is driven by a further electric motor.

A quill 8 which can move in the vertical direction is mounted on the transverse carriage 7 and is connected at its lower end to a coordinate measuring device 5 via a mounting device 10. A probe 9 is detachably arranged on the coordinate measuring device 5. The coordinate measuring device 5 can be moved relative to the transverse carriage 7 in the Y direction of the Cartesian coordinate system, driven by a further electric motor. As a result of the total of four electric motors, the probe 9 can therefore be moved to any point which is in the intermediate space defined by the columns 2, 3 underneath the crossmember 4 and above the measuring table 1.

Figure 2:
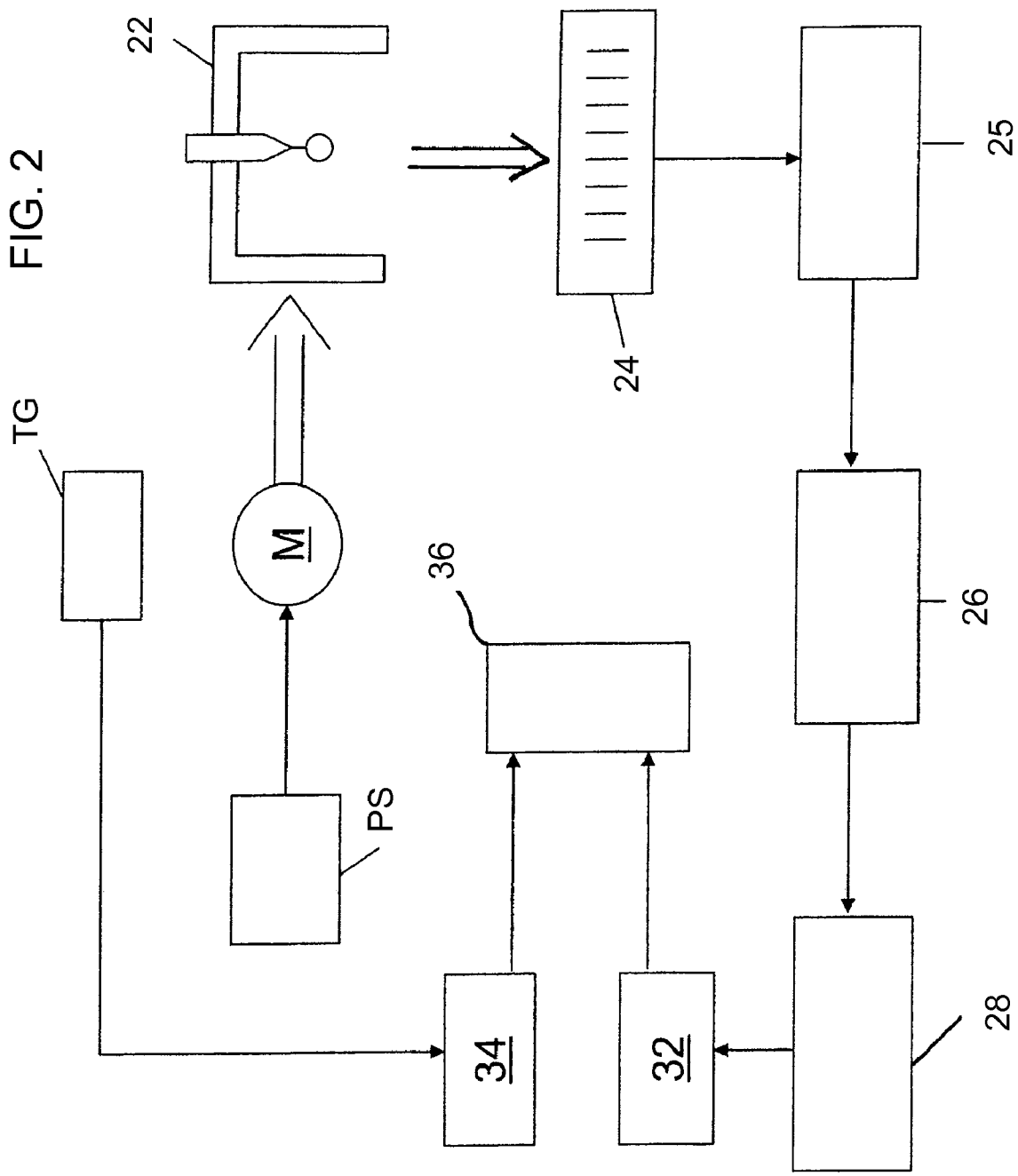
FIG. 2 is a schematic view of an arrangement which has components for processing signals during the operation of a coordinate measuring appliance.

FIG. 2 is a schematic view of a measuring device 22 which can be moved in order to acquire coordinates of a measured object by determining the position of the measuring device 22 (for example the position of a sensing element). In the present exemplary embodiment, the measuring device 22 can move with respect to three linear axes which are independent of one another. Each of the three linear axes has an incremental scale 24. The determination of the position of the measuring device 22 with respect to such an incremental scale is known per se from the prior art (for example magnetic or photoelectric sensing). For example, the position can, as described in DE 43 03 162, be determined by using an incremental photoelectric measuring system. A measuring system which can also be used within the scope of the present invention to determine the coordinates or positions is described in WO 87/07944. An interference measuring principle can be applied.

The reference number 25 in FIG. 2 denotes a corresponding signal transmitter which, according to the current position of the measuring device 22, uses the incremental scale 24 to generate a position signal which is further processed by a downstream interpolator 26. The interpolator 26 also supplies values which are valid for positions between the marks of the incremental scale 24 and which can be utilized by a downstream coordinate determining device 28.

The coordinates which are determined by the coordinate determining device 28 (and which are defined in particular in the coordinate system of the incremental scales 24) are fed to a first determining device 32 for the determination of the speed of the measuring device 22. The speed is determined in each case by forming the derivation of the individual coordinates over time.

In addition, the first determining device 32 (and likewise a second determining device 34 described below) can be configured to detect, according to the predefined criterion, whether a fault is present or whether the criterion is met. In particular it is possible to detect whether one of the determined speed values is too high.

Furthermore, FIG. 2 shows one of a plurality of drive motors M which move the measuring device 22. In order to control the motor M, a power stage PS is provided. In addition, a tachogenerator TG is combined with the motor M or with a shaft which is driven by the motor M and it supplies a tachosignal as a function of the rotational speed of the shaft and therefore as a function of the speed of the measuring device 22 which is moved by the motor M, said tachosignal being a measure of the speed. The tachosignal is fed, on the one hand, to the power stage PS (which can have controllers such as a power controller and a rotational speed controller) in order to control the motor current in accordance with a setpoint value which is fed to the power stage PS. More details are given on an exemplary embodiment of the motor controller with reference to FIG. 3.

The setpoint speed can be determined (in each case separately for the three coordinate axes) from position setpoint values and additionally from information about the speed at which the measuring device 22 is to be moved in its current position. An example of the use of position setpoint values for controlling a coordinate measuring appliance is known from EP 084 965 4.

The tachosignal or a further-processed signal which is derived therefrom is fed to the second determining device 34, which determines the speed of the measuring device 22 therefrom. In this context it is also possible, for example, to take into account various transmission stages of a transmission (not illustrated in FIG. 2) which is arranged between the motor M and the measuring device 22.

If at least one of the determining devices 32, 34 generates a fault signal, said signal is fed to an actuating device 36 which automatically initiates corresponding measures. More details on an exemplary embodiment of such measures are given with reference to FIG. 4. The actuating device in this exemplary embodiment is a relay or a combination of relays with the associated control device.

Figure 3:
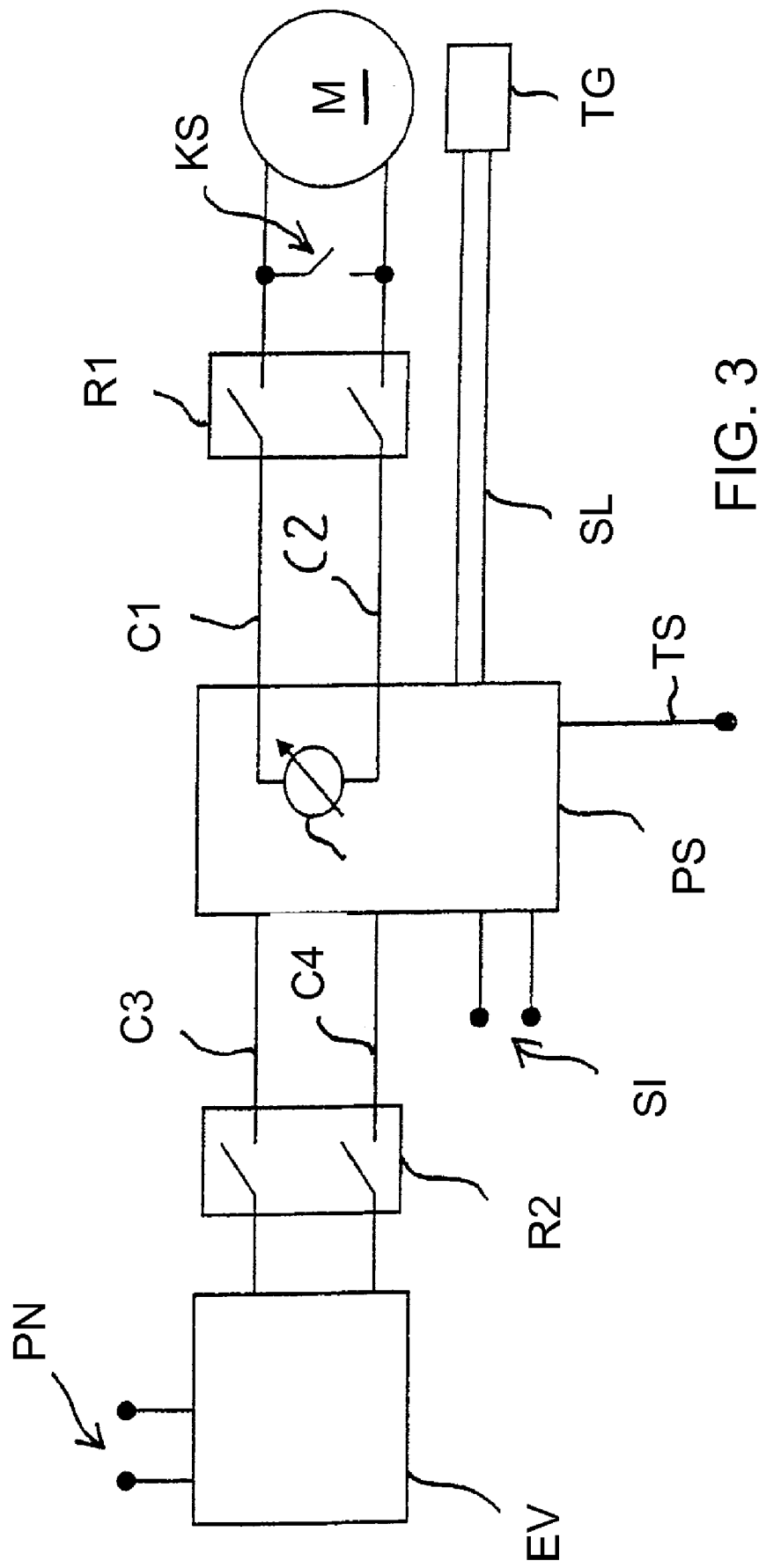
FIG. 3 is a schematic view of an arrangement with a power stage (output stage) from which an electric motor is supplied with motor current.

The arrangement illustrated in FIG. 3 shows a few details indicating how one of the electric motors M of a coordinate measuring appliance, for example the coordinate measuring appliance described with reference to FIGS. 1 and 2, is supplied with current during operation and controlled. The motor M is connected in the exemplary embodiment to a power stage PS via two electrical connections C1, C2. The power stage PS has a signal input SI via which it receives control signals from, for example, a computer or from a microcontroller. Depending on the control signals, the power stage PS sets the motor current which flows via the lines C1, C2.

In particular, the setpoint position and the actual position and/or the setpoint speed of the coordinate measuring device can serve as input variables of the total control device. The total control device can have, apart from the output stage, further controllers, for example power controllers, rotational speed controllers and position controllers.

The power stage PS can be supplied with electric power via a power supply connection PN which can be connected to an electric alternating voltage power supply system, a power supply unit EV which has, for example, a transformer and a rectifier, a two-pole relay R2 and via two electrical connections which connect the power supply unit EV to the power stage PS via the relay R2, the power stage PS requiring said electric power to feed the motor current.

The power stage PS has a power measuring device IM or is combined with such a power measuring device with which the motor current flowing through the electrical connections C1, C2 and through the motor M can be measured. In addition, the power stage PS has an actuator element (not illustrated in more detail in FIG. 2) for setting the motor current.

In addition, a tachosignal generator TG is provided which generates tachosignals as a function of the movement of the electric motor and transmits them via a signal line SL to the power stage PS. The tachosignal generator is, for example, a resolver or a rotational transformer with just one signal generator.

While the coordinate measuring appliance is operating, the power stage PS therefore sets the motor current in the electrical connections C1, C2 (direct current) in accordance with the control signal present at the control signal input SI (for example an analog direct voltage value in the range −10 V to +10 V), and said power stage PS adjusts the speed to the value predefined by the control signal, in which case the power stage PS continuously or quasi-continuously evaluates the tachosignal generated by the tachosignal transmitter.

According to the preferred embodiment of the invention described here, the power stage PS also has a signal output TS for transmitting the tachosignal to the speed monitoring device. However, the tachosignal can also be transmitted directly from the tachosignal transmitter TG to the speed monitoring device.

If the coordinate measuring appliance has a plurality of motors, in each case one arrangement as illustrated in FIG. 2 is preferably provided for each of the electric motors. However, in this case, the power supply unit EV can, for example, be used jointly for all the arrangements.

The fault signal generated by the speed monitoring means preferably triggers the following process: as quickly as possible a control signal which causes the power stage PS to reverse the motor current (i.e. a motor current which actively brakes the motor) is output to the power stage PS. Furthermore, both the relay R1 and the relay R2 are actuated by means of control lines (not illustrated in FIG. 3) in order to open both relays R1, R2. If the two relays are opened, both the power supply of the power stage PS (via the electrical connections C3, C4) and the motor current line (electrical connections C1, C2) are disconnected. Furthermore, a short circuit of the two motor current connections to which the electrical connections C1, C2 are connected is preferably brought about by means of a short-circuit switch KS (see FIG. 2) which is arranged between the relay R1 and the motor M. It is necessary to ensure here that the short circuit is not produced until the relay R1 is already opened.

Figure 4:
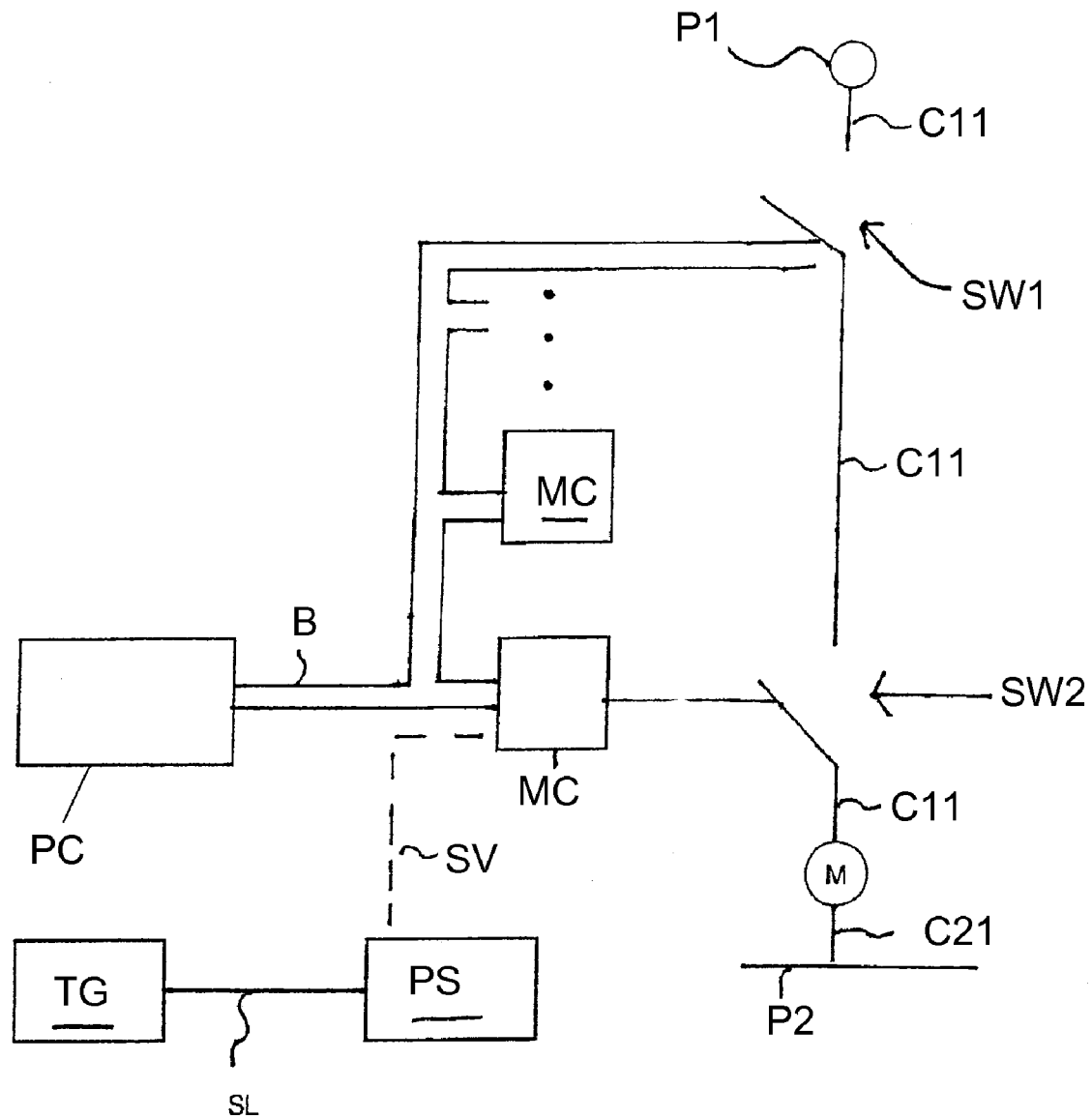
FIG. 4 is a schematic view of an arrangement with a computer and at least one microcontroller.

FIG. 4 shows an arrangement whose various possible methods of functioning will be described in more detail later. The arrangement shows a computer PC which has a databus B or is connected to such a databus. In addition, a plurality of microcontrollers MC are connected to the databus. Two of the microcontrollers MC are illustrated in FIG. 4. As is indicated by three dots it is, however, also possible to provide more microcontrollers, preferably one microcontroller for each electric motor which is to be monitored in the coordinate measuring appliance. However, it is alternatively also possible to provide the same microcontroller for a plurality of electric motors or for all the electric motors.

The lower of the two illustrated microcontrollers MC is assigned, for example, to a specific electric motor M, and this electric motor M is also illustrated in FIG. 4. This microcontroller MC is connected via a signal connection SV to a power stage PS, for example the power stage PS illustrated in FIG. 3. In addition, a tachosignal transmitter TG, which is connected to the power stage PS via a signal line SL and which generates a tachosignal according to the movement of the electric motor M, is in turn provided.

Furthermore, in FIG. 4 it is possible to see an electrical line C11 which leads from a connection P1 at a first electrical potential to the motor M via at least a first switch SW1 and at least a second switch SW2 and supplies the latter with motor current while the motor is operating. A corresponding further electrical line C21 connects the motor M to a second electrical potential (P2). During normal operation of the electric motor M, the power stage PS controls the motor current through the lines C11, C21.

As is also apparent from FIG. 4, the computer PC, which may, for example, be a commercially available personal computer, is connected to the first switch SW1 via the databus B. In order to activate this switch, it is possible to provide further elements which convert a corresponding control signal of the computer PC, which is transmitted via the databus B, for activating the switch SW1. As a result, the computer PC is always capable of switching the switch SW1 on and off. If the computer PC then detects during the monitoring of the speed (in a way which will be described in more detail below) that the motor current has to be disconnected, the computer PC switches off the switch SW1.

Furthermore, the microcontroller MC, which is connected to the power stage PS via the signal connection SV, is capable of switching the second switch SW2 on and off.

In situations which will be explained further below, the microcontroller switches off the switch SW2 in order to disconnect the motor current through the motor M.

If this system is formulated in general terms and the specific exemplary embodiment according to FIG. 4 is not adhered to, preferably at least two different control devices are provided which can disconnect the motor current independently of one another. As a result, additional reliability of the operation of the electric motor and of the axle of the coordinate measuring appliance which is driven by it can be achieved.

The embodiments described below relate to the arrangement according to FIG. 4. Both the computer PC and the microcontroller MC are, as already described with reference to FIG. 4, capable of taking "emergency-off measures" when a fault which is detected by the speed monitoring means occurs. For this purpose, both devices can not only disconnect the motor current individually and independently of one another but also additionally take the measures described with reference to FIG. 3, specifically they can disconnect the so-called intermediate circuit (electrical connections C3, C4 in FIG. 2) and short-circuit the motor.

The computer PC and the microcontrollers MC therefore each have a separate switch-off path. The micro-controllers MC correspond, for example, to the second determining device illustrated in FIG. 2. They determine the second value of the speed from the tachosignal of the respective linear axis or coordinate axis of the coordinate system. The first determining device 32 according to FIG. 2 can be implemented by the computer PC, which therefore determines the first value of the speed from the measured values of the coordinate measuring system. The microcontrollers can also be referred to as slave microcontrollers since they are below the hierarchy level of the computer PC in the hierarchy of overall control of the coordinate measuring appliance. It is possible to provide further microcontrollers within the scope of the coordinate measuring system which are each assigned to a coordinate axis and supply the computer PC with the measured values for determining coordinates.

However, with the invention there is generally also the possibility of the first value of the speed and the second value of the speed being determined by means of the same speed determining device, for example by means of the computer. In this case, the first determining device also acquires the tachosignal. The microcontroller or microcontrollers can then be omitted or assume other tasks, for example that of monitoring the functional capability of the computer.

The invention claimed is:

1. A method for reliably monitoring a speed of a movable coordinate measuring device, the movable coordinate measuring device being part of a coordinate measuring system for determining coordinates of measured objects, which comprises the steps of:
    calculating a first value of the speed from measured values of the coordinate measuring system, the measured values containing information about positions of the movable coordinate measuring device and the measured values are further used for determining the coordinates;
    determining a second value of the speed from measurement signals of at least one additional movement sensor, the measurement signals being used for controlling a drive device of the movable coordinate measuring device; and
    generating a fault signal if, according to a predefined criterion, at least one of the first value and the second value at least one of differ from one another, from a setpoint value and from a limiting value.

2. The method according to claim 1, which further comprises:
    updating repeatedly the first value and the second value resulting in updated values; and
    applying repeatedly the predefined criterion to the updated values in each case.

3. The method according to claim 1, which further comprises carrying out a checking step to determine whether at least one of the first value and the second value is higher than a predefined maximum value, and the maximum value changes over a course of time.

4. The method according to claim 1, wherein the speed is a speed component which can be determined independently of other speed components, and one of a plurality of speed components and all of the speed components, are monitored.

5. The method according to claim 4, wherein the speed component refers to x, y and z directions of a Cartesian coordinate system.

6. A coordinate measuring appliance, comprising:
at least one drive device;
a coordinate measuring system for determining coordinates of measured objects and having a coordinate measuring device which can be moved at least in one direction and driven by said at least one drive device, said coordinate measuring system further having an evaluation device configured for determining coordinates from measured values containing information about positions of said coordinate measuring device;
a drive control device having a movement sensor generating measurement signals of a movement of said coordinate measuring device, the measurement signals being used by said drive control device for controlling said at least one drive device for said coordinate measuring device; and
a monitoring device for reliably monitoring a speed of said coordinate measuring device, said monitoring device having a first speed determining device connected to said coordinate measuring system and calculating a first value of the speed from the measured values supplied by said coordinate measuring system, said monitoring device further having a second speed determining device connected to said movement sensor and determining a second value of the speed from the measurement signals supplied by said movement sensor; and
said monitoring device configured to generate a fault signal if, according to a predefined criterion, at least one of the first value and the second value differ from at least one of one another, a setpoint value and a limiting value.

7. The coordinate measuring appliance according to claim 6, wherein:
said at least one drive device has a power supply with switch-off devices;
said first speed determining device has a first microcomputer;
said second speed determining device has a second microcomputer; and
said first speed determining device and said second speed determining device are each connected to one of said switch-off devices for switching off said power supply of said at least one drive device.

8. The coordinate measuring appliance according to claim 6, wherein said coordinate measuring device is a probe.

9. A method for reliably monitoring a speed of a movable coordinate measuring device, the movable coordinate measuring device being part of a coordinate measuring system for determining coordinates of measured objects, which comprises the steps of:
calculating a first value of the speed from measured values of the coordinate measuring system, the measured values containing information about positions of the movable coordinate measuring device and the measured values are further used for determining the coordinates;
determining a second value of the speed from measurement signals of at least one movement sensor, the measurement signals being usable for controlling a drive device of the movable coordinate measuring device; and
generating a fault signal if, according to a predefined criterion, at least one of the first value and the second value differ from at least one of one another, a setpoint value and a limiting value.

10. The method according to claim 9, which further comprises:
updating repeatedly the first value and the second value resulting in updated values; and
applying repeatedly the predefined criterion to the updated values in each case.

11. The method according to claim 9, which further comprises carrying out a checking step to determine whether at least one of the first value and the second value is higher than a predefined maximum value, and the maximum value changes over a course of time.

12. The method according to claim 9, wherein the speed is a speed component which can be determined independently of other speed components, and one of a plurality of speed components and all of the speed components, are monitored.

13. The method according to claim 12, wherein the speed component refers to x, y and z directions of a Cartesian coordinate system.

* * * * *